(12) United States Patent
Jang et al.

(10) Patent No.: US 11,951,394 B2
(45) Date of Patent: Apr. 9, 2024

(54) APPARATUS AND METHOD FOR ACQUIRING IN-GAME 360 VR IMAGE BY USING PLURALITY OF VIRTUAL CAMERAS

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Jinwook Yang, Uijeongbu-si (KR); Sangpil Yoon, Seoul (KR); Minsu Choi, Seoul (KR); Junsuk Lee, Seoul (KR); Suho Song, Pyeongtaek-si (KR); Bonjae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 381 days.

(21) Appl. No.: 17/235,528

(22) Filed: Apr. 20, 2021

(65) Prior Publication Data
US 2021/0236929 A1    Aug. 5, 2021

Related U.S. Application Data

(63) Continuation of application No. PCT/KR2018/014568, filed on Nov. 23, 2018.

(30) Foreign Application Priority Data

Oct. 22, 2018 (KR) .......................... 10-2018-0125822

(51) Int. Cl.
*H04N 23/698* (2023.01)
*A63F 13/5252* (2014.01)

(52) U.S. Cl.
CPC ....... *A63F 13/5252* (2014.09); *H04N 23/698* (2023.01)

(58) Field of Classification Search
CPC .............. A63F 13/5252; H04N 23/698; G06V 30/141; G06V 10/16; G06T 3/0062
See application file for complete search history.

(56) References Cited

U.S. PATENT DOCUMENTS 9,618,747 B2 *  4/2017  Villmer .................. G06T 11/60
10,880,535 B2 * 12/2020  Oh .......................... H04N 9/31
(Continued)

FOREIGN PATENT DOCUMENTS

FR          3086831    * 10/2018  .......... H04N 19/597
KR     10-0748060 B1     8/2007
(Continued)

OTHER PUBLICATIONS

Office Action dated May 2, 2019 in Korean Application No. 10-2018-0125822, in 6 pages.
(Continued)

*Primary Examiner* — Antonio A Caschera
(74) *Attorney, Agent, or Firm* — Knobbe, Martens, Olson & Bear, LLP

(57) ABSTRACT

An image acquisition apparatus for acquiring an in-game 360 virtual reality (VR) image by using a plurality of virtual cameras includes a virtual camera group taking in-game images by using the plurality of virtual cameras. The image acquisition apparatus may also include a renderer generating textures for the taken images, generating a panoramic image by performing an equirectangular projection (ERP) mapping of the generated textures, and encoding the generated panoramic image. The image acquisition apparatus may further include an image generator generating a 360 VR image by combining audio information with the encoded panoramic image.

10 Claims, 9 Drawing Sheets

(56) References Cited

U.S. PATENT DOCUMENTS

| | | | | |
|---|---|---|---|---|
| 11,653,025 B2* | 5/2023 | Jung | ...................... | H04N 19/85 |
| | | | | 375/240.02 |
| 2019/0082183 A1* | 3/2019 | Shih | ..................... | H04N 19/625 |

FOREIGN PATENT DOCUMENTS

| | | |
|---|---|---|
| KR | 10-2017-0086203 A | 7/2017 |
| KR | 10-2017-0133444 A | 12/2017 |
| KR | 10-2018-0107149 A | 10/2018 |

OTHER PUBLICATIONS

International Search Report and Written Opinion dated Jul. 19, 2019 in International Application No. PCT/KR2018/014568, in 12 pages. English translation of ISR.).
Jaewon. Surround 360 is now open source. IOK Company Convergence Department Development Team 2 Blog. Retrieved May 23, 2019 from http://jokdev2.blogspot.com/2016/08/surround-360-is-now-open-source.html.
Kim et al., "Immersive 360° VR Tiled Streaming System for eSport Service", MMSys'18; Amsterdam, Netherlands; Jun. 13, 2018, pp. 541-544.
Lee et al., "Study on Stereo 360° Game Image Real Time Acquisition", JCCI 2018 (The 28$^{th}$ Joint Conference on Communications and Information), pp. 349-350.
Pramod et al. "Shredder: GPU-Accelerate Incremental Storage and Computation", *CORE*, 2012, pp. 1-15.

* cited by examiner

APPARATUS AND METHOD FOR ACQUIRING IN-GAME 360 VR IMAGE BY USING PLURALITY OF VIRTUAL CAMERAS

CROSS REFERENCE TO RELATED APPLICATIONS

This is a continuation application of International Patent Application No. PCT/KR2018/014568, filed on Nov. 23, 2018, which claims priority to Korean Patent Application No. 10-2018-0125822 filed on Oct. 22, 2018, contents of both of which are incorporated herein by reference in their entireties.

BACKGROUND

Technical Field

The present disclosure relates to an image processing technology. Particularly, the present disclosure relates to an apparatus and method for acquiring an in-game 360 VR image by using a plurality of virtual cameras, that is, for generating the 360 VR image in real time from images taken using the plurality of virtual cameras arranged in a game.

Description of Related Technology

Virtual reality (VR) is emerging as a major issue in the information and communications technologies (ICT) industry, and many information technology (IT) companies are making profits by selling VR devices.

In addition, in order to implement contents for VR experience, 360 VR technology is being developed that stitches images taken from multiple viewpoints and converts the resultant image into a multi-view panoramic image that the user can view at desired viewpoints.

Meanwhile, as part of VR image technology, a scheme of implementing game contents into VR images is being developed. In particular, there is a need for a way to produce e-sports contents, broadcast in real time, as VR contents that can be enjoyed at multiple viewpoints.

SUMMARY

An object of the present disclosure is to provide an apparatus and method for acquiring an in-game 360 VR image by using a plurality of virtual cameras, that is, to provide an apparatus and method for generating the 360 VR image in real time from in-game images taken by the plurality of virtual cameras from various viewpoints.

In order to accomplish the above object, an in-game 360 VR image acquisition apparatus using a plurality of virtual cameras of the present disclosure includes a virtual camera group taking in-game images by using the plurality of virtual cameras, a renderer generating textures for the taken images, generating a panoramic image by performing an equirectangular projection (ERP) mapping of the generated textures, and encoding the generated panoramic image, and an image generator generating a 360 VR image by combining audio information with the encoded panoramic image.

In addition, in the virtual camera group, a pair of left and right virtual cameras are arranged in each direction facing front, back, left, and right from a reference point for taking the images, and a pair of left and right virtual cameras are arranged in each direction facing top and bottom of the front.

In addition, the respective virtual cameras of the virtual camera group are arranged to have an angle of $\pi/2$.

In addition, in the virtual camera group, omni-direction from a reference point for taking the images is divided into N (N is a natural number greater than 4), and left, right, top, and bottom virtual cameras are arranged in each of N directions.

In addition, the respective virtual cameras of the virtual camera group are arranged to have an angle of $2\pi/N$.

In addition, the renderer includes a texture generator capturing the images and generating textures for the respective images, a general-purpose computing on graphics processing unit (GPGPU) ERP engine performing ERP mapping of the generated textures by using pixel mapping data indicating a location of a pixel to be mapped, and generating the panoramic image through the ERP mapping, and an encoder encoding the generated panoramic image for each frame.

In addition, the GPGPU ERP engine performs respective steps in a parallel structure of a pipeline scheme.

In addition, the GPGPU ERP engine generates in advance the pixel mapping data in an initialization process.

In addition, the GPGPU ERP engine gets a writer from a circular buffer disposed between the GPGPU ERP engine and the encoder to perform the ERP mapping.

An image acquisition method of the present disclosure includes, at an image acquisition apparatus, taking in-game images by using a plurality of virtual cameras, at the image acquisition apparatus, generating textures for the taken images, generating a panoramic image by performing an ERP mapping of the generated textures, and encoding the generated panoramic image, and at the image acquisition apparatus, generating a 360 VR image by combining audio information with the encoded panoramic image.

According to the present disclosure, an in-game 360 VR image acquisition apparatus and method using a plurality of virtual cameras can generate in real time a 360 VR image with minimized camera distortion by arranging the plurality of virtual cameras at optimized positions in a game.

In addition, by performing an equirectangular projection (ERP) process in a parallel pipeline structure, it is possible to shorten an operation time.

DETAILED DESCRIPTION

Figure 1:
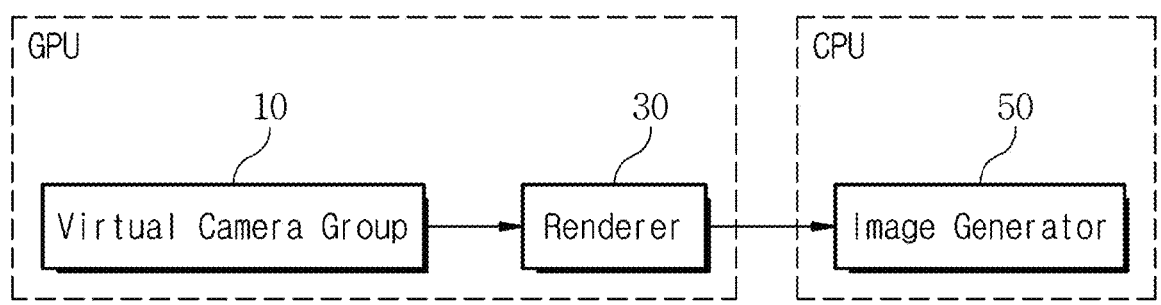
FIG. 1 is a block diagram illustrating an image acquisition apparatus according to an embodiment of the present disclosure.

Hereinafter, an embodiment of the present disclosure will be described in detail with reference to the accompanying drawings. In the drawings, the same elements are denoted by the same reference numerals as much as possible even if they are shown in different drawings. In describing the present disclosure, if it is determined that a detailed description of a related known configuration or function is apparent to those skilled in the art or may obscure the subject matter of the present disclosure, the detailed description will be omitted.

FIG. 1 is a block diagram illustrating an image acquisition apparatus according to an embodiment of the present disclosure.

Referring to FIG. 1, the image acquisition apparatus 100 generates a 360 VR image in real time from images taken by a plurality of virtual cameras that perform shooting from various viewpoints in a game. The image acquisition apparatus 100 includes a virtual camera group 10, a renderer 30, and an image generator 50.

The virtual camera group 10 takes in-game images by using the plurality of virtual cameras. The plurality of virtual cameras are arranged so that their viewing angles do not overlap each other, and take images to cover all directions of 360 degrees viewed from a specific reference point in the game. In the virtual camera group 10, the number of virtual cameras is adjustable depending on the performance of the image acquisition apparatus 100. That is, as the performance of the image acquisition apparatus 100 increases, a greater number of virtual cameras constituting the virtual camera group 10 may be arranged in the game. Preferably, the number of arranged virtual cameras of the virtual camera group 10 may be optimized to prevent a game speed from slowing down due to the plurality of virtual cameras.

The renderer 30 generates textures for a plurality of images taken by the virtual camera group 10, and generates a panoramic image by performing an equirectangular projection (ERP) mapping of the generated textures. The renderer 30 encodes the generated panoramic image. The renderer 30 is capable of performing the ERP in a parallel structure of a pipeline scheme. Through this, the renderer 30 supports to generate a 360 VR image in real time by shortening an operation time.

The image generator 50 generates a 360 VR image by combining audio information with the panoramic image encoded by the renderer 30. Here, the image generator 50 may capture and store the audio information before combining it with the panoramic image, and then retrieve and use the stored audio information when combining it with the panoramic image. The image generator 50 video-streams the generated 360 VR image. The image generator 50 may output the video-streamed 360 VR image to the outside.

Meanwhile, the image acquisition apparatus 100 is implemented with a graphics processing unit (GPU) and a central processing unit (CPU). Specifically, the virtual camera group 10 and the renderer 30 may be implemented with the GPU, and the image generator 50 may be implemented with the CPU.

Figure 2:
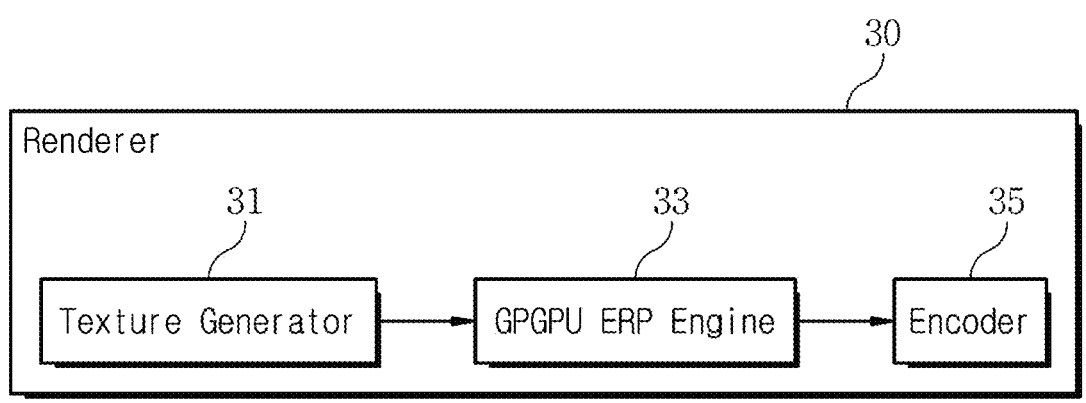
FIG. 2 is a block diagram illustrating a renderer according to an embodiment of the present disclosure.

FIG. 2 is a block diagram illustrating a renderer according to an embodiment of the present disclosure.

Referring to FIGS. 1 and 2, the renderer 30 includes a texture generator 31, a general-purpose computing on graphics processing unit (GPGPU) ERP engine 33, and an encoder 35.

The texture generator 31 captures a plurality of images taken by the virtual camera group 10 and generates textures for the respective images. The texture generator 31 may generate such a texture as 16-bit raw data. The texture generator 31 may generate the textures depending on the positions of the virtual cameras, thereby generating the textures covering all directions of 360 degrees viewed from a specific reference point.

The GPGPU ERP engine 33 performs, using pixel mapping data, ERP mapping of the textures generated by the texture generator 31, and generates a panoramic image through the ERP mapping. Here, the pixel mapping data is data indicating a location of a pixel to be mapped, and the GPGPU ERP engine 33 generates in advance the pixel mapping data in an initialization process to maximize performance at a performing step. Meanwhile, the GPGPU ERP engine 33 can increase an operation speed by performing respective performing steps in a parallel structure of a pipeline scheme.

The encoder 35 encodes the panoramic image generated by the GPGPU ERP engine 33 for each frame. Through this, the encoder 35 may convert the panoramic image into a format that can be combined with audio information.

FIGS. 3A to 9 are diagrams illustrating a reference for arranging locations of virtual cameras according to an embodiment of the present disclosure.

Figure 3A:
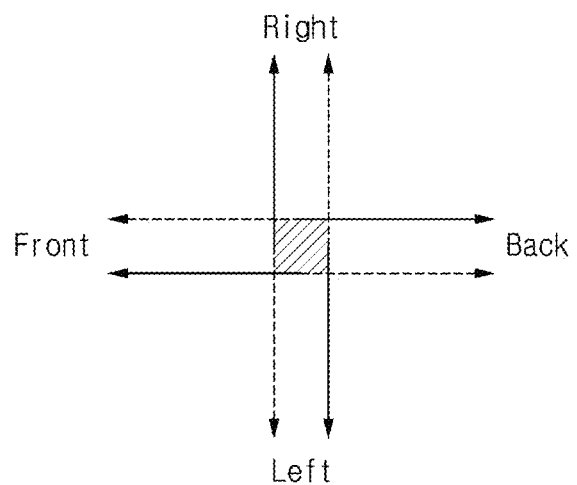
FIGS. 3A, 3B, 4, 5, 6, 7, 8 and 9 are diagrams illustrating a reference for arranging locations of virtual cameras according to an embodiment of the present disclosure.
Figure 3B:
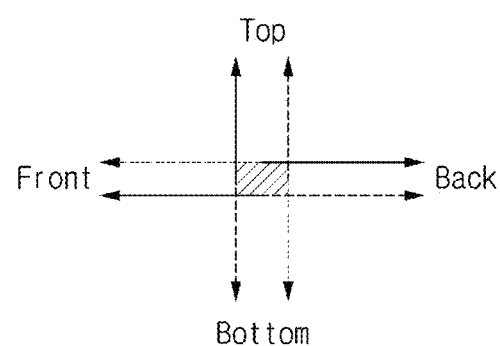
Figure 4:
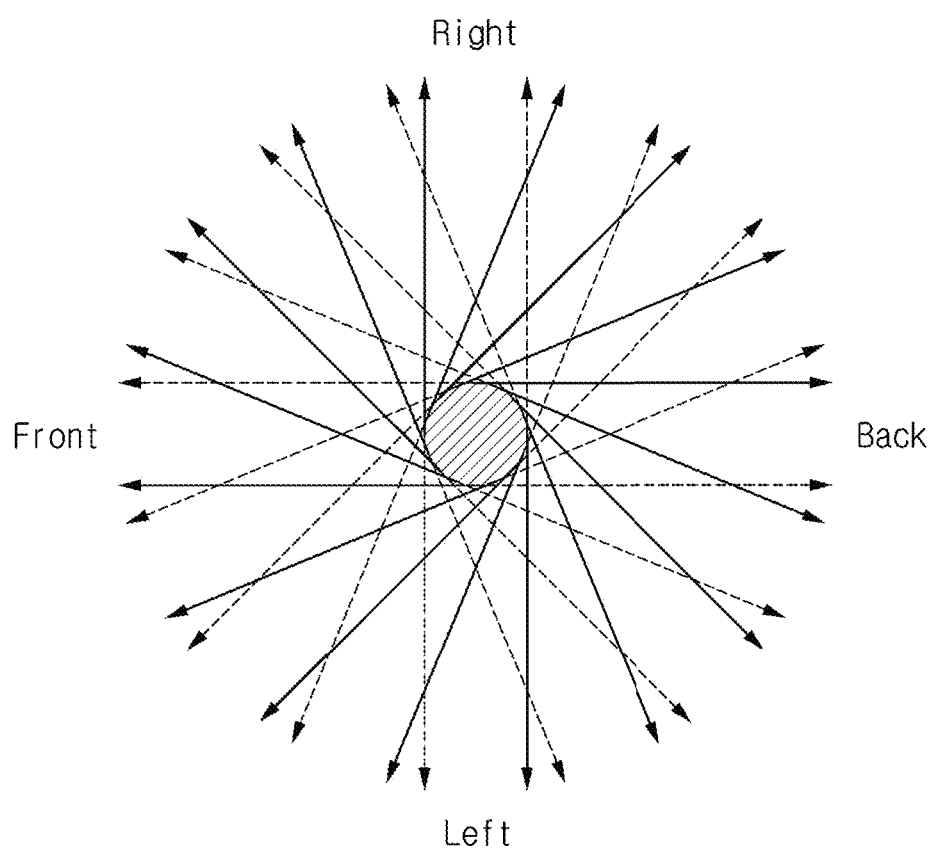

Referring to FIGS. 3A to 9, a plurality of virtual cameras constituting the virtual camera group 10 are arranged to take images from various viewpoints in the game. There are two methods of arranging the plurality of cameras of the virtual camera group 10. One is a method of maximizing the performance of the image acquisition apparatus 100 by arranging a minimum number of cameras (FIGS. 3A and 3B), and the other is a method of maximizing the quality of a 360 VR image by arranging a sufficient number of cameras (FIG. 4).

As shown in FIGS. 3A and 3B, in the camera group 10 for the method of maximizing the performance of the image acquisition apparatus 100, a pair of left and right virtual cameras are arranged in each direction facing front, back, left, and right from a reference point for taking an image (see FIG. 3A). Further, in the camera group 10, a pair of left and right virtual cameras are arranged in each direction facing top and bottom of the front (see FIG. 3B). In this case, the respective virtual cameras are arranged to have an angle of π/2. This arrangement structure can minimize distortion of an image taken by the virtual cameras and also prevent the hardware performance of the image acquisition apparatus 100 from reaching a limit. In the camera group 10, the virtual cameras facing top and bottom are arranged only in the front, which can minimize the image distortion in the front where the user mainly views the 360 VR image and thereby prevent the image distortion that the user actually feels. That is, the virtual cameras of the camera group 10 may be twelve in total, that is, two in the front, two in the back, two in the left, two in the right, two in the top, and two in the bottom.

As shown in FIG. 4, in the camera group 10 for the method of maximizing the quality of the 360 VR image, omni-direction from the reference point for taking an image is divided into N (N is a natural number greater than 4), and left, right, top, and bottom virtual cameras are arranged in each of N directions. In this case, the respective virtual cameras are arranged to have an angle of 2π/N. Through this, the virtual camera group 10 can take images for various viewpoints and thereby acquire a high-quality 360 VR image. Preferably, when the performance of the image acquisition apparatus 100 is high, the virtual camera group 10 can perform the method of maximizing the quality of the 360 VR image to prevent a phenomenon that a game progression speed decreases.

Meanwhile, the arrangement angle for the virtual cameras of the virtual camera group 10 may be set according to the following principle.

When rotation on respective coordinate axes in a 3D virtual space is called yaw, pitch, and roll, each of which can be expressed as a rotation matrix as shown in Equation 1.

$$\text{yaw}(\alpha) = \begin{bmatrix} \cos\alpha & 0 & \sin\alpha & 0 \\ 0 & 1 & 0 & 0 \\ -\sin\alpha & 0 & \cos\alpha & 0 \\ 0 & 0 & 0 & 1 \end{bmatrix}$$ [Equation 1]

$$\text{pitch}(\beta) = \begin{bmatrix} 1 & 0 & 0 & 0 \\ 0 & \cos\beta & -\sin\beta & 0 \\ 0 & \sin\beta & \cos\beta & 0 \\ 0 & 0 & 0 & 1 \end{bmatrix}$$

$$\text{roll}(\gamma) = \begin{bmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{bmatrix}$$

Rotation for a virtual camera rig is defined as a matrix product of yaw, pitch, and roll as shown in Equation 2.

$$\text{rig}(\alpha,\beta,\gamma) = \text{yaw}(\alpha)\text{pitch}(\beta)\text{roll}(\gamma) \quad \text{[Equation 2]}$$

Each virtual camera is connected to the virtual camera rig and moves. Therefore, each virtual camera rotates on new x', y', and z' axes which correspond to the existing x, y, and z axes in the 3D space rotated in the same way as the rotation of the virtual camera rig.

When a rotation angle of each virtual camera with respect to the z' axis is defined as θ, the rotation of the virtual camera in top, front, and down directions may be defined for the rotation angle θ as in Equation 3.

$$\text{cam}_{top}(\theta) = \text{yaw}(\theta)\text{pitch}\left(\frac{\pi}{2}\right) \quad \text{[Equation 3]}$$

$$\text{cam}_{front}(\theta) = \text{yaw}(\theta)$$

$$\text{cam}_{down}(\theta) = \text{yaw}(\theta)\text{pitch}\left(\frac{3\pi}{2}\right)$$

In order to acquire a stereo image, left-eye and right-eye virtual cameras need to be placed at different coordinates, and this feature can be defined as a movement with respect to the y' axis. In this case, a moving distance is half of an eyedistance, which is a predefined constant. If this is expressed as a matrix, it is as shown in Equation 4.

$$\text{Eye}_{left} = \begin{bmatrix} 1 & 0 & 0 & 0 \\ 0 & 1 & 0 & -\frac{\text{Eye Distance}}{2} \\ 0 & 0 & 1 & 0 \\ 0 & 0 & 0 & 1 \end{bmatrix}$$ [Equation 4]

$$\text{Eye}_{left} = \begin{bmatrix} 1 & 0 & 0 & 0 \\ 0 & 1 & 0 & \frac{\text{Eye Distance}}{2} \\ 0 & 0 & 1 & 0 \\ 0 & 0 & 0 & 1 \end{bmatrix}$$

When rotation angles of coordinates (x, y, z) with respect to the respective coordinate axes in the 3D virtual space of the virtual camera rig are α, β, and γ, a change matrix for each virtual camera facing the x-axis direction from the coordinates (0, 0, 0) is as shown in Equation 5.

$$\text{eyedir} = \{\text{left, right}\} \quad \text{[Equation 5]}$$

$$\text{camdir} = \{\text{top, front, down}\}$$

$$\text{cam}_{eyedir,camdir}(\theta, x, y, z, \alpha, \beta, \gamma) = \begin{bmatrix} x \\ y \\ z \end{bmatrix} \text{Eye}_{eyedir} \text{cam}_{camdir}(\theta)\text{rig}(\alpha,\beta,\gamma)$$

Figure 5:
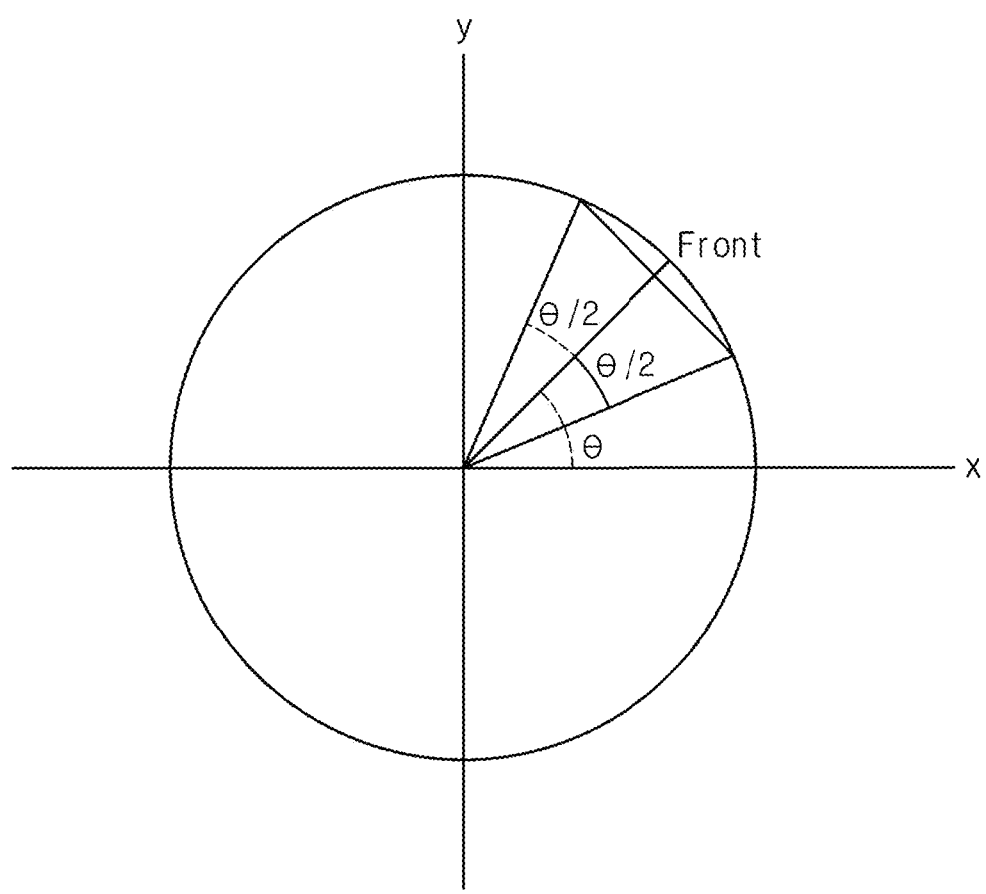
Figure 6:
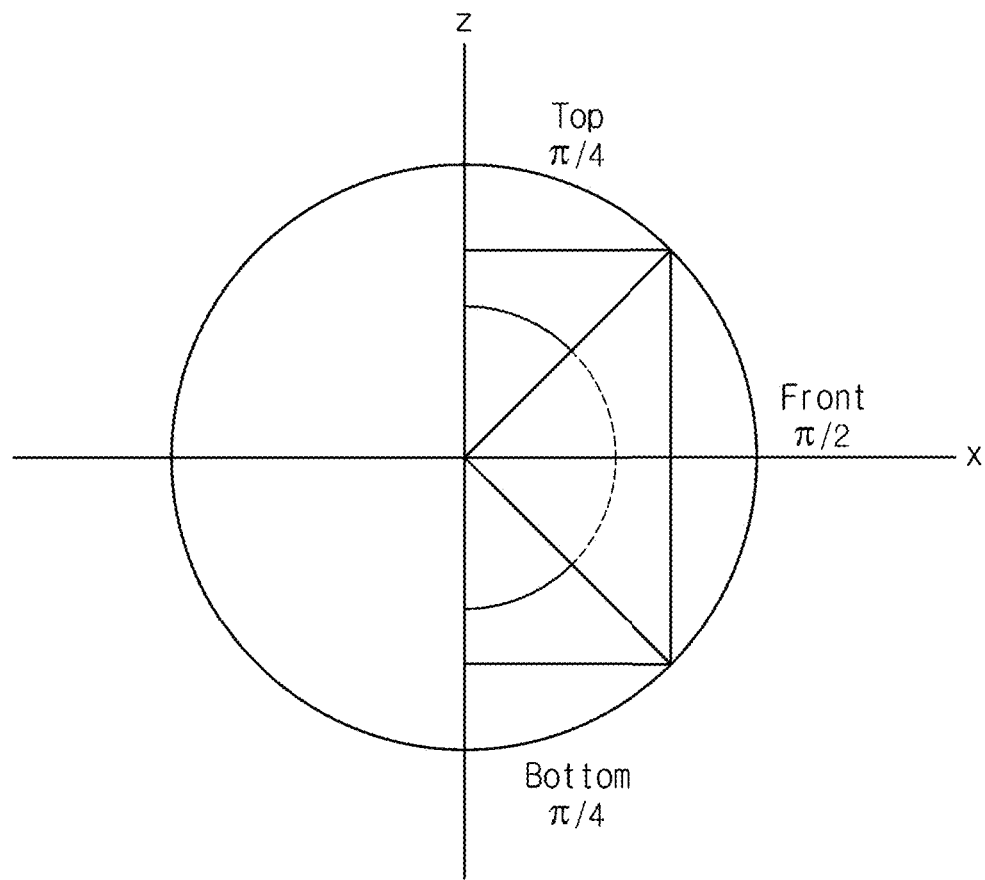
Figure 7:
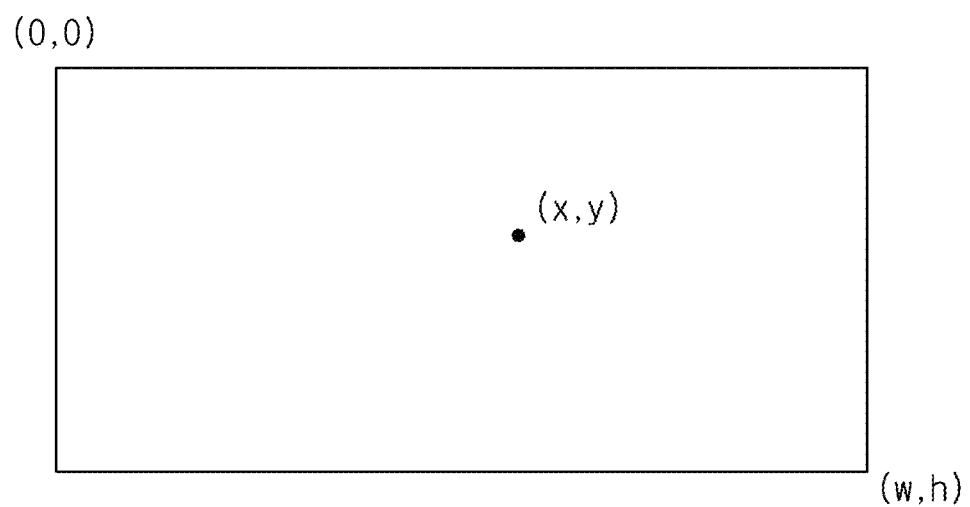
Figure 8:
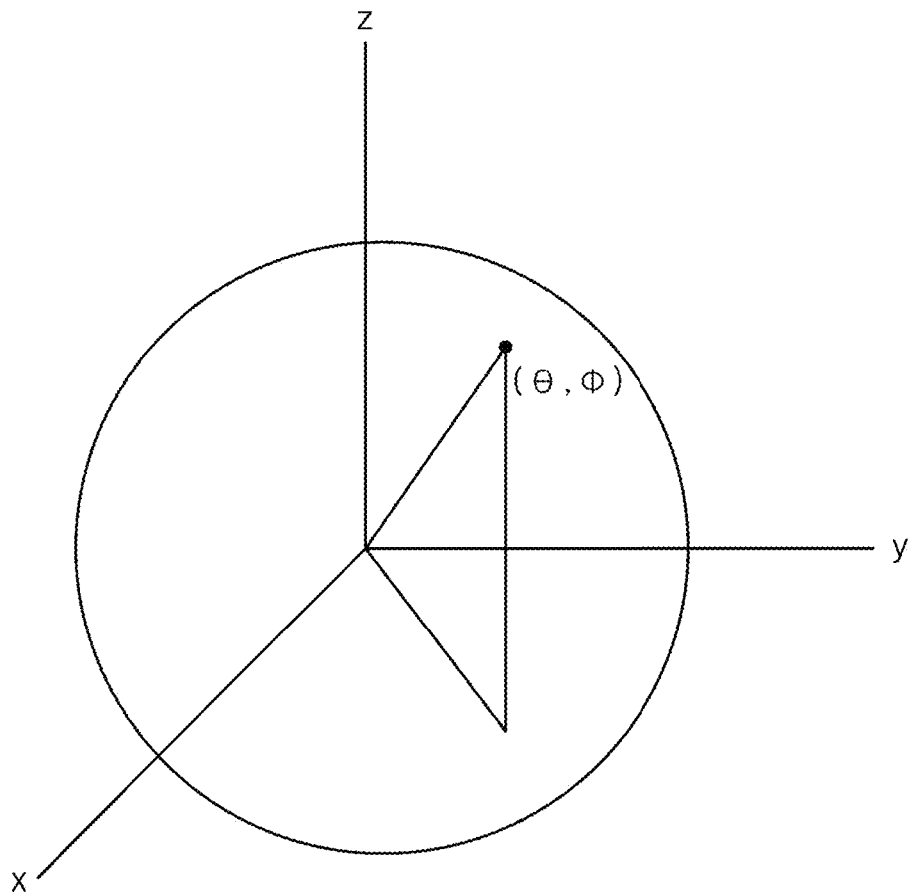
Figure 9:
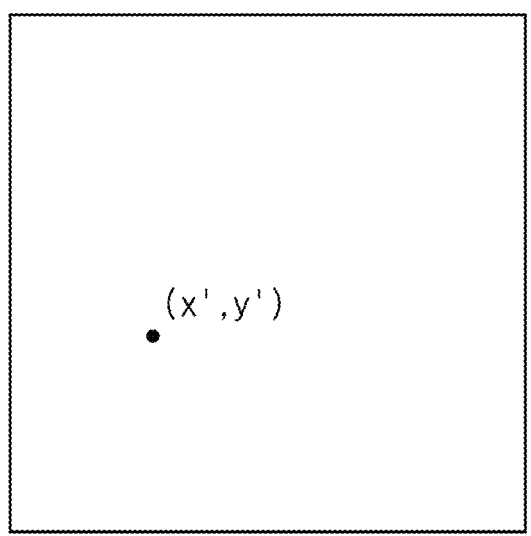

Here, the unit of the θ value varies depending on the number of directions 'n' of the virtual cameras to be arranged. A shooting range of each virtual camera is the same as the range of a straight line inscribed in a circle as shown in FIG. 5 depicting the x-axis and y-axis and FIG. 6 depicting the x-axis and z-axis.

Meanwhile, in order to convert an image taken by the virtual camera into a 360 panoramic image, an equation for calculating coordinates (x', y') of the image taken by the virtual camera with respect to coordinates (x, y) of the panoramic image is required.

The panorama conversion is perform with ERP, and after the plane coordinates are mapped to specific coordinates of the sphere, the corresponding coordinates are then mapped to specific coordinates of the virtual camera image.

When the horizontal and vertical lengths of the panoramic image are referred to as w and h, and when the values of specific coordinates of the panoramic image are expressed as (x, y)(see FIG. 7), an equation for converting the values of the corresponding coordinates into coordinates (θ, Φ) on the spherical surface is as shown in Equation 6.

$$\theta = \frac{2x}{w}\pi \quad \text{[Equation 6]}$$

$$\phi = \frac{y}{h}\pi$$

Then moving the coordinate system so that the center of the panoramic image coincides with the actual center, Equation 7 is derived.

$$\theta = \frac{2x - w}{w}\pi \quad \text{[Equation 7]}$$

$$\phi = \frac{2y - h}{2h}\pi$$

Based on the calculated θ value, it is necessary to select a virtual camera corresponding to the corresponding coordinates. When virtual cameras are arranged in n directions, a camera number 'i' that satisfies Equation 8 is calculated.

$$\text{cam}_{start}(i) = \frac{\pi}{n}(i - 1) \quad \text{[Equation 8]}$$

$$\text{cam}_{end}(i) = \frac{\pi}{n}(i + 1)$$

$$\text{cam}_{start}(i) \leq \theta < \text{cam}_{end}(i)$$

Depending on the selected virtual camera number 'i', it is necessary to convert θ into a relative angle θ' at the center of each virtual camera shooting range. That is, θ is converted into θ' through Equation 9.

$$\theta' = \theta - \text{cam}_{start}(i) \quad \text{[Equation 9]}$$

$\Phi_{thr}$ for determining the top and bottom directions according to the value of θ' is calculated as in Equation 10.

$$\text{atan2}(y, x) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases} \quad \text{[Equation 10]}$$

$$\phi_{thr} = \text{atan2}\left(1, \frac{1}{\cos\theta'}\right)$$

Based on the value of Φ', virtual cameras corresponding to the top, front, and bottom directions are selected. This selection of virtual cameras uses Equation 11.

$$\begin{cases} \text{front} (\phi \leq \phi_{thr}, \phi \geq -\phi_{thr}) \\ \text{top} (\phi > \phi_{thr}) \\ \text{bottom} (\phi \leftarrow \phi_{thr}) \end{cases} \quad \text{[Equation 11]}$$

Depending on the determined directions, it is necessary to convert Φ into a relative angle Φ' at the center of each virtual camera shooting range. That is, Φ' is obtained using Equation 12.

$$\phi' = \begin{cases} \phi + \frac{\phi_{thr}}{2} & (\text{front}) \\ \phi - \phi_{thr} & (\text{top}) \\ \phi + \phi_{thr} & (\text{bottom}) \end{cases} \quad \text{[Equation 12]}$$

In addition, when the size of each virtual camera image is w' and h', coordinates (x', y') in each virtual camera image may be defined as in Equation 13.

$$x' = \frac{w'}{2}\left(\frac{\sin\theta'}{\cos\theta'} + 1\right) \quad \text{[Equation 13]}$$

$$y' = \frac{h'}{2}\left(\frac{\sin\phi'}{\cos\phi'\cos\theta'} + 1\right)$$

Meanwhile, a mapping table for (x, y)=>(x', y') is created and used for quick calculation, and also a reverse mapping table for (x', y')=>(x, y) is created and used for parallel operation.

As described above, the plurality of virtual cameras can be arranged at optimized positions to maintain the quality of the panoramic image.

Figure 10:
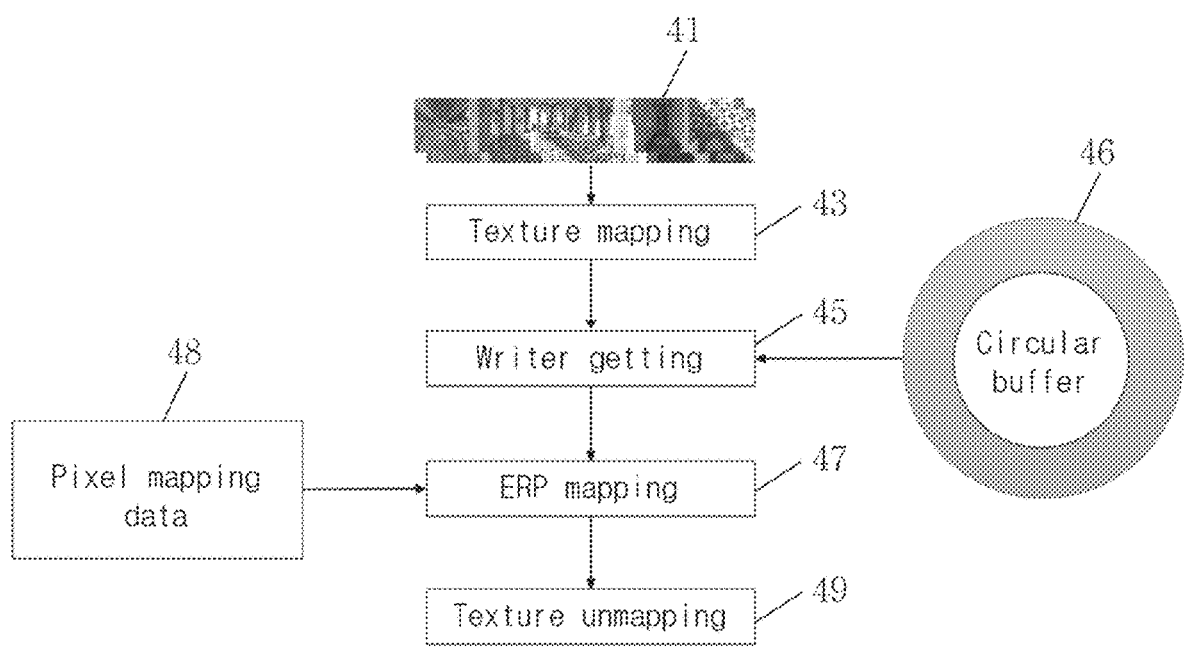
FIGS. 10 and 11 are diagrams illustrating a driving process of a GPGPU ERP engine according to an embodiment of the present disclosure.
Figure 11:
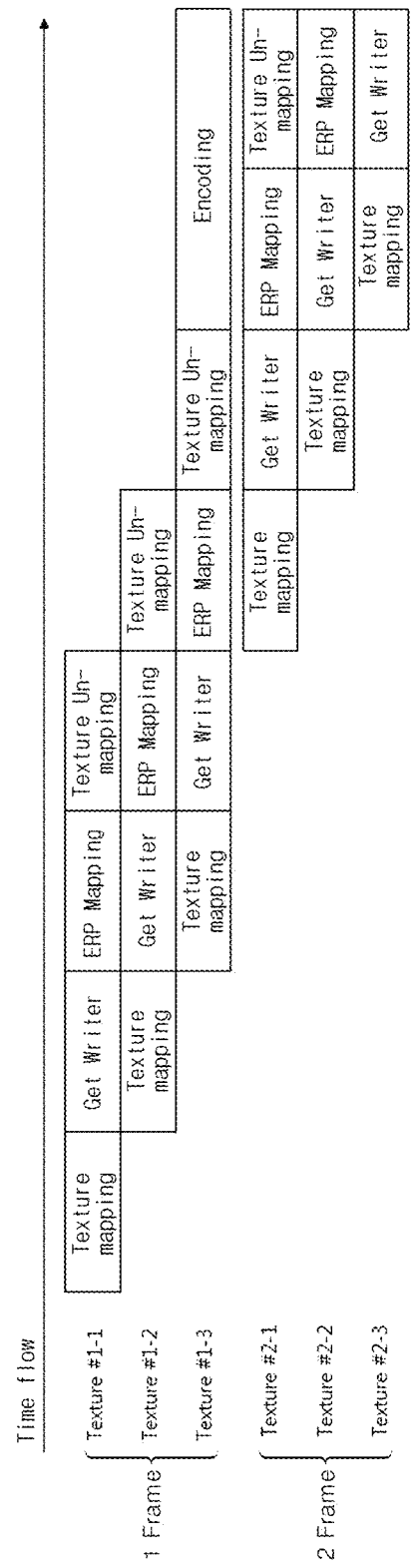

FIGS. 10 and 11 are diagrams illustrating a driving process of a GPGPU ERP engine according to an embodiment of the present disclosure.

Referring to FIGS. 2, 10, and 11, the GPGPU ERP engine 33 generates a panoramic image by performing an ERP mapping for textures. Specifically, the GPGPU ERP engine 33 may be operated in the following order.

The GPGPU ERP engine 33 sequentially performs a step 41 of receiving a texture, a step 43 of performing a texture mapping for the received texture, a step 45 of getting a writer, a step 47 of performing an ERP mapping, and a step 49 of performing a texture unmapping.

The texture mapping step 43 is performed to access a memory, and the writer getting step 45 is performed to allow writing and thereby enable the following ERP mapping step to be performed. Here, the writer is gotten from a circular buffer 46, which is disposed between the GPGPU ERP engine 33 and the encoder 35. The ERP mapping step 47 may use pixel mapping data 48. Here, the pixel mapping data 48 is data indicating the location of a pixel to be mapped, and is generated in advance during the initialization process. Through this, the ERP mapping step 47 does not need to perform a complex ERP operation, so that the GPGPU ERP engine 33 can shorten the operation time. The texture unmapping step 49 performs unmapping of the texture for rendering.

Meanwhile, the GPGPU ERP engine 33 can perform the respective steps in a parallel pipeline structure. For example, when mapping of a first texture in a first frame is completed, the GPGPU ERP engine 33 gets a first writer at the next step, and simultaneously starts mapping of a second texture. In such a way, the respective steps are performed in succession. After all the steps for the textures corresponding to one frame are completed, the GPGPU ERP engine 33 performs encoding.

Therefore, the GPGPU ERP engine 33 can shorten the operation time through operations of the parallel pipeline structure and the ERP operation performed in the initialization step, thereby enabling real-time rendering.

Figure 12:
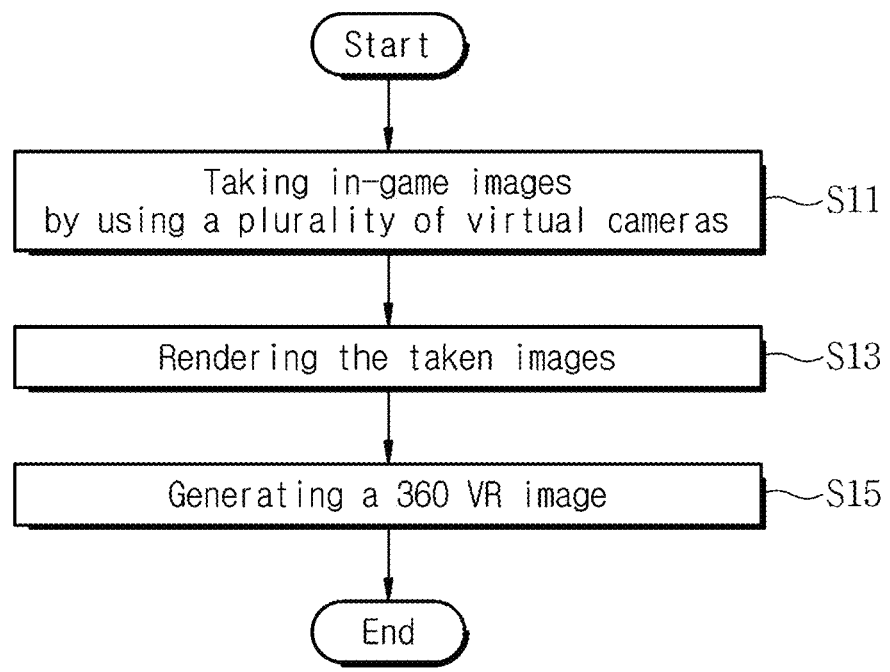
FIG. 12 is a flow diagram illustrating an image acquisition method according to an embodiment of the present disclosure.

FIG. 12 is a flow diagram illustrating an image acquisition method according to an embodiment of the present disclosure.

Referring to FIG. 12, the image acquisition method can generate in real time a 360 VR image with minimized camera distortion by arranging a plurality of virtual cameras at optimized positions in a game. The image acquisition method can also shorten the operation time by performing the ERP process in a parallel pipeline structure.

At step S11, the image acquisition apparatus 100 takes in-game images by using the plurality of virtual cameras. In the image acquisition apparatus 100, the plurality of virtual cameras are arranged so that their viewing angles do not overlap each other, and take images to cover all directions of 360 degrees viewed from a specific reference point in the game. As the performance of the image acquisition apparatus 100 increases, a greater number of virtual cameras may be arranged in the game. Preferably, the number of arranged virtual cameras may be optimized to prevent a game speed from slowing down due to the plurality of virtual cameras.

At step S13, the image acquisition apparatus 100 performs rendering by using the taken images. Specifically, the image acquisition apparatus 100 generates textures for a plurality of images taken by the plurality of virtual cameras, and generates a panoramic image by performing an ERP mapping of the generated textures. The image acquisition apparatus 100 encodes the generated panoramic image. The image acquisition apparatus 100 is capable of performing the ERP in a parallel structure of a pipeline scheme. Through this, the image acquisition apparatus 100 supports to generate a 360 VR image in real time by shortening an operation time.

At step S15, the image acquisition apparatus 100 generates a 360 VR image by using the rendered panoramic image. That is, the image acquisition apparatus 100 generates the 360 VR image by combining audio information with the encoded panoramic image. The image acquisition apparatus 100 video-streams the generated 360 VR image. The image acquisition apparatus 100 may output the video-streamed 360 VR image to the outside.

The present disclosure can be implemented as a computer-readable code on a computer-readable recording medium. The computer-readable recording medium includes all types of recording devices that store data that can be read by a computer device. The computer-readable recording media include, for example, a hard disk, a ROM, a RAM, a CD-ROM, a magnetic tape, a floppy disk, an optical data storage device, and the like, and may be implemented in the form of carrier waves (e.g., transmission via the Internet).

While the present disclosure has been particularly shown and described with reference to an exemplary embodiment thereof, it will be understood by those skilled in the art that various changes in form and details may be made therein without departing from the scope of the present disclosure as defined by the appended claims.

[Reference Numeral]

10: Virtual Camera Group
30: Renderer
31: Texture Generator
33: GPGPU ERP Engine
35: Encoder
50: Image Generator
100: Image Acquisition Apparatus

What is claimed is:

1. An in-game 360 virtual reality (VR) image acquisition apparatus using a plurality of virtual cameras, the apparatus comprising:
    a virtual camera group configured to take in-game images by using the plurality of virtual cameras;
    a renderer configured to generate textures for the taken images, generate a panoramic image by performing an equirectangular projection (ERP) mapping of the generated textures, and encode the generated panoramic image; and
    an image generator configured to generate a 360 VR image by combining audio information with the encoded panoramic image, and further configured to video-stream the generated 360 VR image and output the video-streamed 360 VR image to an outside of the apparatus,
    wherein in the virtual camera group, omni-direction from a reference point for taking the images is divided into N (N is a natural number greater than 4), and a pair of left and right virtual cameras are arranged in each of N directions.

2. The apparatus of claim 1, wherein in the virtual camera group, omni-direction from a reference point for taking the images is divided into 4, the pair of left and right virtual cameras are arranged in each direction facing front, back, left, and right from a reference point for taking the images, and wherein the pair of left and right virtual cameras are arranged in each direction facing top and bottom of the front.

3. The apparatus of claim 2, wherein the respective virtual cameras of the virtual camera group are arranged to have an angle of π/2.

4. The apparatus of claim 1, top and bottom virtual cameras are arranged in each of the N directions.

5. The apparatus of claim 1, wherein the respective virtual cameras of the virtual camera group are arranged to have an angle of 2π/N.

6. The apparatus of claim 1, wherein the renderer includes:
    a texture generator configured to capture the images and generate textures for the respective images;
    a general-purpose computing on graphics processing unit (GPGPU) ERP engine configured to perform ERP mapping of the generated textures by using pixel mapping data indicating a location of a pixel to be mapped, and generate the panoramic image through the ERP mapping; and
    an encoder configured to encode the generated panoramic image for each frame.

7. The apparatus of claim 6, wherein the GPGPU ERP engine is configured to perform respective steps in a parallel structure of a pipeline scheme.

8. The apparatus of claim 6, wherein the GPGPU ERP engine is configured to generate in advance the pixel mapping data in an initialization process.

9. The apparatus of claim 6, wherein the GPGPU ERP engine is configured to get a writer from a circular buffer disposed between the GPGPU ERP engine and the encoder to perform the ERP mapping.

10. An image acquisition method to be performed in an in-game 360 virtual reality (VR) image acquisition apparatus using a plurality of virtual cameras, the method, comprising:
    at an image acquisition apparatus, taking in-game images by using a virtual camera group comprising a plurality of virtual cameras;
    at the image acquisition apparatus, generating textures for the taken images, generating a panoramic image by performing an equirectangular projection (ERP) mapping of the generated textures, and encoding the generated panoramic image;
    at the image acquisition apparatus, generating a 360 virtual reality (VR) image by combining audio information with the encoded panoramic image;
    at the image acquisition apparatus, video-streaming the generated 360 VR image; and
    at the image acquisition apparatus, outputting the video-streamed 360 VR image to an outside of the image acquisition apparatus,
    wherein in the virtual camera group, omni-direction from a reference point for taking the images is divided into N (N is a natural number greater than 4), and a pair of left and right virtual cameras are arranged in each of N directions.

* * * * *